United States Patent Office 2,873,193
Patented Feb. 10, 1959

2,873,193
METHOD OF ISOLATING CARAMEL COLOR VALUES

James E. Cleland and Alvin Le Roy Meyer, Granite City, Ill., assignors to Union Starch & Refining Company, Columbus, Ind., a corporation of Indiana No Drawing. Application February 6, 1956
Serial No. 563,407

4 Claims. (Cl. 99—148)

This invention relates to a process of isolating high color polymers from burnt or caramelized sugar compositions.

This application is a continuation-in-part of U. S. application Serial No. 268,142, filed January 24, 1952.

Burnt sugar coloring or caramel color contains a substantial quantity of unchanged sugar. The polymers contributing coloring power constitute only a minor part of the total weight, ordinarily not over 25-30%. It would be very advantageous to be able to convert a large quantity of the sugar to color polymers in burning processes but this is exceedingly difficult to do or perhaps impossible by means of practical, large scale procedures. A certain limit is reached in direct burning where instability results if the burning process is continued. Apparently polymerization proceeds too far as manifested by a very sharply rising viscosity and diminished solubility. The reaction can be continued until an insoluble gel is obtained and this develops long before all the sugar is consumed in the burning process. This result must be avoided in commercial burning processes and they are stopped after relatively low yields of color are produced. Much effort has been expended in an attempt to increase the yield of color from a given quantity of sugar by modifications of burning procedures, catalyst systems, etc., but without much success. The practical limit has remained fixed within fairly narrow confines for many years.

There is another approach to this problem that has been more rewarding in increasing the yield of color from sugar. This method involves burning to the practical limit of stability and then separating the color imparting polymers, which are in colloidal form, by any means that can be used to remove the colloidal phase from the crystalloids. The latter (sugars) are then burned to yield another crop of colloidal coloring polymers and the operation is repeated until all the sugars are converted to color. This is a practical method but a complicated process involving very large capital investment in equipment, reagents, etc. Such a method is disclosed and claimed in our U. S. Patent No. 2,533,221.

Among the objects of this invention is to provide a simplified method of utilizing the unburned or residual sugars to make useful products and thereby making a caramel color of greater coloring ability or a concentrated color.

Among other objects of this invention is to provide a method for isolating the coloring compounds from caramel color and for utilizing the unconverted sugar to make useful products in the course of the processing operation.

It may contribute to the ready comprehension of this invention to point out here that all of the caramel colors of commerce unless processed after burning are very resistant to attack by microorganisms. This is caused by the fact that a number of very efficient inhibitors to their growth are formed in the burning operation and as by-products of the pyrolysis of sugars. Hence it is possible to dilute an ordinary caramel color with several parts of water, inoculate with large quantities of very potent yeast, mold spores, etc., and still find it impossible to induce any appreciable fermentation under the most favorable temperature conditions possible for incubation or proliferation of the organisms. This property of ordinary commercial caramel colors is widely recognized and relied upon by some users who depend on the caramel color to provide protection against spoilage of their more susceptible mixtures. A well known fermentation test is widely used to evaluate this bacteriostatic property of caramel color.

This invention is based on the discovery that contrary to general belief, the bacterial inhibitors are removable from caramel color by several relatively simple methods. The unexpected result is that the unpolymerized sugars in caramel color then become very readily fermentable and/or subject to attack by microorganisms or enzymes and capable of producing relatively high yields of fermentation or similar products. The color bodies are on the other hand very resistant to attack by any of the common organisms. It is upon this unexpected combination of circumstances that this invention depends. By subjecting the unburned sugars in the caramel color to fermentation processes they are converted into useful substances that are readily separable from the color producing compounds which are thereby isolated and can be concentrated.

The above cited objects and others ancillary thereto are obtained by (1) providing a caramelized sugar solution, (2) removing bacterial inhibitors from the solution, (3) fermenting or otherwise treating the resultant composition to change the non color sugar bodies remaining in the product to useful commercial products and (4) separating the color bodies from the thus produced commercial products.

The caramelized sugar solution may be made in any known way from any of the commercially available sugar solutions.

The bacterial inhibitors may be removed or deactivated in any way which does not affect quality of the color bodies. These inhibitors appear to be by-products of the pyrolysis of sugars and to have greater volatility and greater solubility than the sugars of the said color bodies. At any rate the inhibitors can be removed by distillation of the diluted solution, by preferential solvent extraction or by ion exchangers.

The fermentation may be carried out with yeasts, enzymes, moulds, bacteria or other microorganisms capable of changing sugars to useful commercial products. Many such processes are known and utilized to produce various organic acids, alcohols, organic solvents, etc.

Yeasts which are suitable strains of *Saccharomyces cerevisiae* may be employed for the production of ethyl alcohol from the sugars in the syrup. With such yeasts, temperatures of around 28-33° C. may be employed after the pH of the mix is adjusted to about 4.0 to 5.0. *S. anamensis* or *S. pombe* may also be employed. *Saccharomyces ellipsoideus* (var Steinberg) and *S. ellipsoideus* (var. California) yeasts may be employed for the production of glycerol from the glucose and similar components of the caramel syrup.

Molds such as *Aspergillus niger, A. aureus, A. clavatus, P. luteum, P. citrinum, Ustulina vulgaris* etc. may be employed for the production of citric acid from the glucose and similar components of the caramel syrup. *Aspergillus niger* (Strain 67) or the presence of calcium carbonate may be employed for the production of gluconic acid from the said glucose and similar components. *P. chrysogenum* (Culture 5,034,11) may also be employed for the production of gluconic acid in the presence of sodium nitrate, potassium dihydrogen phosphate and magnesium sulfate.

Bacteria such as *Bact. putidum* may be employed for the production of gluconic acid or calcium gluconate. Various acetobacter species of bacteria *Acetobacter aceti* may be employed for the production of acetic acid from the glucose.

Instead of the microorganisms themselves, as mentioned above, specific enzymes derived from the microorganisms may be employed to convert the glucose of the caramel liquor to a non sugar product which may be separated and recovered from the liquor.

It will be realized that the process of separating the color bodies from the organic reagent produced by the fermentation or other treatment will vary depending on the type of organic reagent produced. Decantation, solvent extraction, crystallization, reaction of organic acids with alkaline precipitants and various other known chemical and physical methods of separation may be employed.

The following description of typical applications of the invention are given by way of illustration but are not to be construed in a limiting sense.

*Example 1*

One thousand gallons of caramel color produced by a conventional burning process and having a tinctorial power of 25 to 30 units (A solution of 1.0 gram in 1000 ml. of water is matched in a ½" cell against Lovibond Series No. 52 caramel color slides.) is diluted with water to about 20° Bé. The excess water is evaporated in a vacuum pan, at not less than 26° of vacuum, until the Baumé is increased to about 38°. In this manner essentially all of the effective bacterial inhibitors pass off with the vapor and are removed from the caramel color. It will be found that the sugars in the solution are now readily fermentable by yeast and other organisms when adjusted to a favorable concentration.

After the inhibitors have been removed by the above described distillation step the caramel color is again diluted to about 20° Bé. with water and is inoculated with a culture of *Aspergillus niger*. This organism requires a considerable quantity of oxygen to thrive and the fermentation is accordingly conducted in shallow pans or caused to circulate in a cascade system over a series of trays. Citric acid can be produced by this method in satisfactory yields and when the fermentation has proceeded to completion the acid produced is neutralized with lime to make calcium citrate. This compound is relatively insoluble in the aqueous solution and may be separated by decantation and filtration.

The mother liquor from which the sugars have been removed by the above process is heated to about 180° F. and is again filtered through a heavy precoating of diatomaceous filter aid in order to remove the inactivated spores, coagulated proteins and residual calcium salts, etc. Following this step the pH of the mother liquor is adjusted to 2.5–3.0 and concentrated to about 50% solids in a vacuum evaporator. The result is a solution of relatively pure color bodies or color imparting polymers and a very desirable form of caramel color for beverages, etc. It has a tinctorial power several times that of the caramel color from which it was made on an equal solids basis. It may be dried to a powder and is relatively non-hygroscopic in comparison with the ordinary dry caramel colors.

It is obvious that once the bacterial inhibitors are removed from the caramel color in accordance with the methods of our invention the sugars are fermentable and may be subjected to any useful type of fermentation to make alcohols, other organic acids or any other of the products normally made by the action of microorganisms on sugars.

The type of vacuum distillation described is not the only means of removal of the volatile inhibitors. These may be simply boiled off from dilute solutions by evaporating at atmospheric pressure but this method is of much lower efficiency both in respect to steam consumption and complete removal of the inhibiting constituents. More elaborate equipment than a simple vacuum pan may be used to advantage also. We have had good results with a vegetable oil deodorizer that works on the principle of subjecting the liquid to a steam scrubbing operation under vacuum in a countercurrent system in which the caramel color flows over a series of plates equipped with bubble caps.

*Example 2*

The caramel color is diluted and the bacterial inhibitors, etc., are removed as set forth in Example 1. After the inhibitors have been removed, the caramel color liquor is again diluted to about 20° Bé. with water and is inoculated with *Saccharomyces cerevisiae* (yeast). This organism will react with the sugar in caramel color in tanks producing ethyl alcohol and carbon dioxide. The ethyl alcohol is removed by vaccum distillation during the final concentration period of the pure caramel bodies.

The fermentation reaction is maintained at temperatures of 28–33° C. and at a pH range of 40–50 for the best results.

The mother liquor from which the sugars have been removed by the above process is heated to 180° F. and is filtered through a heavy precoating of diatomaceous filter aid in order to remove the inactivated yeast spores, coagulated protein, etc. Following this step the pH of the mother liquor is adjusted to 2.5–3.0 and concentrated to about 50% solids in a vacuum evaporator. As mentioned above the vapors can be passed through a rectifying column in order to separate the ethyl alcohol from the water vapors. The resulting color bodies will have the same properties and tinctorial power as set forth in Example 1.

*Example 3*

The caramel color is diluted and the bacterial inhibitors, etc., are removed as set forth in Example 1.

After the inhibitors have been removed the caramel color liquor is again diluted to about 20° Bé. with water and is inoculated with a culture of bacterium putidum. This organism requires a considerable quantity of oxygen to thrive and the fermentation is accordingly conducted in shallow pans or caused to circulate in a cascade system over a series of trays or bottles. Gluconic acid is produced by this method in satisfactory yields and when the fermentation has proceeded to completion the acid produced is neutralized with lime to make calcium gluconate. This compound is relatively insoluble in the aqueous solution and is separated by decantation and filtration.

The mother liquor from which the sugars have been removed can be processed in the same manner as outlined in Example 1.

We claim:

1. A process for separating the color bodies from caramelized carbohydrate solutions comprising the steps of providing a caramelized sugar solution containing caramel color bodies, residual uncaramelized sugar and fermentation inhibiting constituents formed in situ when the sugar is caramelized, removing the fermentation inhibiting constituents, thereafter inoculating the solution with an organism adapted to change the residual uncaramelized sugar to a different material of lower molecular weight, and separating the said different material of low molecular weight from the caramel color bodies.

2. A process for separating the color bodies from caramelized carbohydrate solutions comprising the steps of providing a caramelized sugar solution containing caramel color bodies, residual uncaramelized sugar and fermentation inhibiting constituents formed in situ when the sugar is caramelized, diluting the solution with an aqueous liquid removing the fermentation inhibiting constituents by distilling water from the solution, thereafter inoculating the solution with an organism adapted to change the residual uncaramelized sugar to an alcohol, and separating said alcohol from the caramel color bodies.

3. A process for separating the color bodies from caramelized carbohydrate solutions comprising the steps of caramelizing a sugar solution by heat treating it under caramelizing conditions to provide thereby a solution containing caramel color bodies, residual uncaramelized sugar and fermentation inhibiting constituents formed in situ when the sugar is caramelized, diluting the solution with an aqueous liquid, removing the fermentation inhibiting constituents, thereafter inoculating the solution with an organism adapted to change the residual uncaramelized sugar to a different material of lower molecular weight, and separating the said different material of low molecular weight from the caramel color bodies.

4. A process for separating the color bodies from caramelized carbohydrate solutions comprising the steps of providing a caramelized sugar solution containing caramel color bodies, residual uncaramelized sugar and fermentation inhibiting constituents formed in situ when the sugar is caramelized, diluting the solution with an aqueous liquid, removing the fermentation inhibiting constituents by distilling water from the solution, thereafter inoculating the solution with an organism adapted to change the residual uncaramelized sugar to a different material of lower molecular weight, and separating the said different material of low molecular weight from the caramel color bodies.

References Cited in the file of this patent
UNITED STATES PATENTS 2,142,739    Wallace _____ Jan. 3, 1939